US009037358B2

(12) United States Patent
Ota et al.

(10) Patent No.: US 9,037,358 B2
(45) Date of Patent: May 19, 2015

(54) WHEEL LOADER

(75) Inventors: Toshiyuki Ota, Komatsu (JP); Nobuo Matsuyama, Komatsu (JP)

(73) Assignee: KOMATSU LTD., Tokyo (JP)

( * ) Notice: Subject to any disclaimer, the term of this patent is extended or adjusted under 35 U.S.C. 154(b) by 96 days.

(21) Appl. No.: 13/574,724

(22) PCT Filed: Dec. 21, 2011

(86) PCT No.: PCT/JP2011/079632
§ 371 (c)(1),
(2), (4) Date: Jul. 23, 2012

(87) PCT Pub. No.: WO2012/086684
PCT Pub. Date: Jun. 28, 2012

(65) Prior Publication Data

US 2012/0296533 A1 Nov. 22, 2012

(30) Foreign Application Priority Data

Dec. 24, 2010 (JP) ................................ 2010-288263

(51) Int. Cl.

| | |
|---|---|
| ***G06F 7/70*** | (2006.01) |
| ***G06F 19/00*** | (2011.01) |
| ***G06G 7/00*** | (2006.01) |
| ***G06G 7/76*** | (2006.01) |
| ***F02D 11/10*** | (2006.01) |
| ***E02F 9/20*** | (2006.01) |
| *F02D 41/10* | (2006.01) |
| *F02D 41/24* | (2006.01) |

(52) U.S. Cl.
CPC ............ *F02D 11/105* (2013.01); *E02F 9/2066* (2013.01); *F02D 41/10* (2013.01); *F02D 41/2422* (2013.01); *F02D 2200/702* (2013.01)

(58) Field of Classification Search
USPC ................ 701/50, 70, 99, 101; 123/319, 349
See application file for complete search history.

(56) References Cited

U.S. PATENT DOCUMENTS

| | | | | |
|---|---|---|---|---|
| 5,317,937 | A * | 6/1994 | Yoshizawa et al. | 477/120 |
| 2005/0256631 | A1 * | 11/2005 | Cawthorne et al. | 701/99 |
| 2006/0276948 | A1 * | 12/2006 | Toda | 701/50 |
| 2010/0198470 | A1 * | 8/2010 | Weck et al. | 701/67 |

FOREIGN PATENT DOCUMENTS

| | | | |
|---|---|---|---|
| JP | 2006-74931 | A | 3/2006 |
| JP | 2007-276594 | A | 10/2007 |
| WO | WO-2005/024208 | A1 | 3/2005 |

OTHER PUBLICATIONS

International Search Report of corresponding PCT Application No. PCT/JP2011/079632.

* cited by examiner

*Primary Examiner* — Yonel Beaulieu
*Assistant Examiner* — Lail Kleinman
(74) *Attorney, Agent, or Firm* — Global IP Counselors, LLP

(57) ABSTRACT

An engine control device of the wheel loader includes a travelling state detecting unit for detecting a travelling state of the wheel loader, a mode switching determining unit, an acceleration speed detecting unit and a switching time controlling unit. The acceleration speed detecting unit detects the acceleration speed of the wheel loader when the mode switching determining unit determines that it is required to switch between the engine output modes from a low output mode to a high output mode based on a detection result of the travelling state detecting unit. The switching time control unit controls the switching time from start to end of mode switching to be: a first time when the acceleration speed detected by the acceleration speed detecting unit is either 0 or negative; and a second time greater than the first time when the detected acceleration speed is positive.

6 Claims, 9 Drawing Sheets

(a)

(b)

(a)

(b)

VEHICLE SPEED
(OUTPUT SHAFT ROTATION SPEED)

(rpm)

| 1ST SPEED | 2ND SPEED | 3RD SPEED | 4TH SPEED |
|---|---|---|---|
| 800 | 1300 | 2300 | 3000 |

ACCELERATION SPEED
(CHANGE RATE OF OUTPUT SHAFT ROTATION SPEED)

(rpm/sec)

| 1ST SPEED | 2ND SPEED | 3RD SPEED | 4TH SPEED |
|---|---|---|---|
| 100 | 80 | 70 | 60 |

(a)

(b)

(a)

(b)

WHEEL LOADER

CROSS-REFERENCE TO RELATED APPLICATIONS

This application claims priority to Japanese Patent Application No. 2010-288263 filed on Dec. 24, 2010, the disclosure of which is hereby incorporated herein by reference in its entirety.

TECHNICAL FIELD

The present invention relates to a wheel loader including an engine control device configured to execute a control of switching between engine output modes from a low output mode to a high output mode or vice versa.

BACKGROUND ART

As described in International Patent Application Publication No. WO2005/024208 A1 and etc., a low output mode for allowing an engine to exert low output performance and a high output mode for allowing the engine to exert high output performance are set as engine output modes in work vehicles such as wheel loaders. Further, in the case of flatland travelling, for instance, light load acts on the engine, and therefore, the low output mode is selected for reducing fuel consumption. In the case of hill-climb travelling, by contrast, the high output mode is selected because a high output is required. Switching controls from the low output mode to the high output mode and vice versa are configured to be automatically executed depending on load and etc.

SUMMARY

The following drawbacks are caused in the work vehicle described in Patent Literature 1 when the low output mode is switched into the high output mode especially in hill-climb travelling.

First, explanation will be made for the case that the work vehicle shifts from flatland travelling to hill-climb travelling. While the work vehicle travels on a flatland, a light load acts on the engine and therefore the low output mode is selected as an output mode as described above. When it is then detected that the work vehicle has shifted to hill-climb travelling, the low output mode is switched into the high output mode. When switching timing is delayed in such a phase, the vehicle speed is reduced and acceleration performance is also degraded in the initial stage after the work vehicle shifts to hill-climb travelling. Therefore, it is required to quickly switch the low output mode into the high output mode.

When the work vehicle is started moving from halfway up a hill, an operation of the work vehicle is started in the low output mode similarly to when the work vehicle is started moving on a flatland. When it is then detected that the work vehicle is started moving on a hill through the detection by an inclination sensor, load detection and etc., the low output mode is switched into the high output mode. When the output mode is quickly switched in such a phase similarly to the above, engine output performance is increased although engine load is unchanged. Therefore, the vehicle is supposed to be abruptly accelerated. This makes an operator feel strange.

It is an object of the present invention to execute an appropriate switching control depending on a phase in switching between engine output modes in a wheel loader for achieving smooth travelling and simultaneously for preventing an operator from having a feeling of strangeness.

A wheel loader according to the first aspect of the present invention is a wheel loader having a low output mode and a high output mode as engine output modes. The wheel loader includes an engine, a driving wheel, a power transmission device, a work implement and an engine control device. The power transmission device is configured to transmit driving force from the engine to the driving wheel. The work implement is configured to be driven by the driving force from the engine. The engine control device is configured to execute a control of switching between the engine output modes from the low output mode to the high output mode or vice versa. The engine control device includes a travelling state detecting unit, a mode switching determining unit, an acceleration detecting unit and a switching time controlling unit. The travelling state detecting unit is configured to detect a travelling state of a vehicle (wheel loader). The mode switching determining unit is configured to determine based on a detection result by the travelling state detecting unit whether or not it is required to switch between the engine output modes from the low output mode to the high output mode. The acceleration detecting unit is configured to detect an acceleration of the vehicle when the mode switching determining unit determines that it is required to switch between the engine output modes. The switching time controlling unit is configured to control a switching time from start to end of the mode switching to be: a first time when the acceleration detected by the acceleration detecting unit is either 0 or negative; and a second time greater than the first time when the detected acceleration is positive. It should be noted that the acceleration may be either an acceleration in switching between modes or an average of accelerations in an immediate predetermined period of time including a point of time in switching between modes.

The present engine control device detects a travelling state of the vehicle such as hill-climb travelling or hill start. Based on the detection result, the engine output modes are switched from the low output mode to the high output mode. Further, the acceleration of the vehicle is detected in switching between modes. Yet further, a period of time from start to end of switching between the output modes is controlled depending on a detected result of the acceleration. Specifically, the switching time is controlled to be the first time when the detected acceleration is either 0 or negative. On the other hand, the switching time is controlled to be the second time greater than the first time when the detected acceleration is positive.

For example, when the vehicle has shifted from flatland travelling to hill-climb travelling, the vehicle reduces the vehicle speed. Therefore, the acceleration becomes either 0 or negative. In such a case, the switching time is reduced and the engine output modes are quickly switched from the low output mode to the high output mode. Accordingly, it is possible to inhibit a situation that the vehicle speed is reduced and thereby acceleration performance is degraded when the vehicle has shifted to hill-climb travelling.

On the other hand, the vehicle is accelerated at hill start, although the acceleration is gentle. Therefore, the acceleration becomes positive. In such a case, the switching time is increased contrary to the aforementioned case. Accordingly, it is possible to avoid a situation that the work vehicle abruptly accelerates immediately after hill start. It is thereby possible to inhibit an operator from having a feeling of strangeness.

A wheel loader according to a second aspect of the present invention is a wheel loader having a low output mode and a high output mode as engine output modes. The wheel loader includes an engine, a driving wheel, a power transmission device, a work implement and an engine control device. The power transmission device is configured to transmit driving force from the engine to the driving wheel. The work implement is configured to be driven by the driving force from the engine. The engine control device is configured to execute a control of switching between the engine output modes from the low output mode to the high output mode or vice versa. The engine control device includes a travelling state detecting unit, a mode switching determining unit, an acceleration detecting unit and an output torque change rate controlling unit. The travelling state detecting unit is configured to detect a travelling state of a vehicle. The mode switching determining unit is configured to determine based on a detection result by the travelling state detecting unit whether or not it is required to switch between the engine output modes from the low output mode to the high output mode. The acceleration detecting unit is configured to detect an acceleration of the vehicle when the mode switching determining unit determines that it is required to switch between the engine output modes. The output torque change rate controlling unit is configured to control a change rate of an output torque of the engine from start to end of the mode switching to be: a first change rate when the acceleration detected by the acceleration detecting unit is either 0 or negative; and a second change rate less than the first change rate when the detected acceleration is positive. It should be noted that similarly to the above, the acceleration may be either an acceleration in switching between modes or an average of accelerations in an immediate predetermined period of time including a point of time in switching between modes.

Similarly to the first aspect of the present invention, the present engine control device switches between the engine output modes from the low output mode to the high output mode based on the detection result of the travelling state of the vehicle, and further, the acceleration of the vehicle is detected. Then, the change rate of the engine output torque in switching between modes is controlled in accordance with the detection result of the acceleration. Specifically, the change rate of the engine output torque is controlled to be the first change rate when the detected acceleration is either 0 or negative while being controlled to be the second change rate less than the first change rate when the detected acceleration is positive.

Even the second aspect of the present invention can achieve an advantageous effect similar to that achieved by the first aspect of the present invention. Specifically, the change rate of the engine output torque is controlled to be the relatively large first change rate when the vehicle has shifted from flatland travelling to hill-climb travelling. Therefore, the mode switching time is reduced and the engine output modes are quickly changed from the low output mode to the high output mode. Accordingly, it is possible to inhibit a situation that the vehicle speed is reduced and acceleration performance is thereby degraded when the vehicle has shifted to hill-climb travelling.

On the other hand, the change rate of the engine output torque is controlled to be the relatively small second change rate at hill start. Therefore, the mode switching time is increased and it is possible to avoid a situation that the work vehicle abruptly accelerates immediately after hill start. As a result, it is possible to inhibit an operator from having a feeling of strangeness.

A wheel loader according to a third aspect of the present invention relates to the wheel loader according to one of the first and second aspects of the present invention. In the wheel loader, the travelling state detecting unit is configured to detect that the vehicle is in a hill-climb travelling state.

It is mainly in the case of hill-climb travelling that an operator has a feeling of strangeness in switching between the engine output modes. It should be particularly noted in the third aspect of the present invention that it is detected whether or not the travelling state is a hill-climb travelling state. Therefore, it is possible to inhibit reduction in the vehicle speed in hill-climb travelling, and simultaneously, inhibit an operator from having a feeling of strangeness.

A wheel loader according to a fourth aspect of the present invention relates to the wheel loader according to the third aspect of the present invention. In the wheel loader, the travelling state detecting unit is configured to determine that the vehicle is in the hill-climb travelling state in satisfying: a condition that a vehicle speed is less than or equal to a predetermined value; a condition that a throttle opening degree is kept to be greater than or equal to a preliminarily set threshold opening degree closer to a fully opened throttle opening degree for a predetermined period of time or greater; and a condition that a brake operation is not being performed.

It can be assumed to use a sensor for measuring inclination of the vehicle as means for detecting that the vehicle is in a hill-climb travelling state. However, cost increase is inevitable in providing the inclination sensor. Further, it is difficult for the inclination sensor to accurately detect that the vehicle is in a hill-climb travelling state when the vehicle executes a work in a wilderness. Therefore, there are high chances of erroneous detection.

In view of the above, in the fourth aspect of the present invention, it is determined whether or not the travelling state is a hill-climb travelling state based on a general operation of an operator in hill-climb travelling. Specifically, the hill-climb travelling state is established in satisfying: the condition that the vehicle speed is less than or equal to a predetermined value; the condition that the throttle opening degree is kept to be greater than or equal to a predetermined opening degree for a predetermined period of time or greater; and the condition that a brake operation is not being performed. It should be noted that continuation of a nearly fully opened throttle opening degree for a predetermined period of time or greater is set to be one of the conditions in order to exclude a state that the vehicle starts moving on a flatland.

It is herein possible to detect the hill-climb travelling state using a sensor normally provided for a wheel loader without using a special inclination sensor.

A wheel loader according to a fifth aspect of the present invention relates to the wheel loader according to the fourth aspect of the present invention. In the wheel loader, the travelling state detecting unit is further configured to determine that the vehicle is in the hill-climb travelling state when the acceleration is less than or equal to a predetermined value.

It is herein possible to detect that the vehicle is in the hill-climb travelling state without using a special sensor. Further, the acceleration is also taken into account other than the vehicle speed, the throttle opening degree and whether or not a brake operation is performed. Therefore, it is possible to reliably exclude flatland travelling with a light load and accurately detect the hill-climb travelling state.

A wheel loader according to a sixth aspect of the present invention relates to the wheel loader according to one of the first aspect and the third to fifth aspects of the present invention. In the wheel loader, the switching time controlling unit is configured to: determine that the vehicle has shifted from flatland travelling to hill-climb travelling and control the switching time to be the first time when the acceleration detected by the acceleration detecting unit is either 0 or negative; and determine that the vehicle starts moving on a hill and control the switching time to be the second time when the detected acceleration is positive.

Similarly to the first aspect of the present invention, the engine output modes are herein quickly switched from the low output mode to the high output mode when the vehicle has shifted from flatland travelling to hill-climb travelling. Accordingly, it is possible to inhibit a situation that the vehicle speed is reduced and acceleration performance is degraded when the vehicle has shifted to hill-climb travelling. On the other hand, the switching time is increased at hill start and it is possible to avoid a situation that the work vehicle abruptly accelerates immediately after hill start. As a result, it is possible to inhibit an operator from having a feeling of strangeness.

A wheel loader according to a seventh aspect of the present invention relates to the wheel loader according to one of the second to fifth aspects of the present invention. In the wheel loader, the output torque change rate controlling unit is configured to: determine that the vehicle has shifted from flatland travelling to hill-climb travelling and control the change rate of the output torque to be the first change rate when the acceleration detected by the acceleration detecting unit is either 0 or negative; and determine that the vehicle starts moving on a hill and control the change rate of the output torque to be the second change rate when the detected acceleration is positive.

Similarly to the second aspect of the present invention, the mode switching time is herein reduced and the engine output modes are quickly changed from the low output mode to the high output mode when the vehicle has shifted from flatland travelling to hill-climb travelling. It is thereby possible to inhibit a situation that the vehicle speed is reduced and acceleration performance is degraded when the vehicle has shifted to hill-climb travelling. On the other hand, the mode switching time is increased at hill start and it is possible to avoid a situation that the work vehicle abruptly accelerates immediately after hill start. As a result, it is possible to inhibit an operator from having a feeling of strangeness.

A wheel loader according to an eighth aspect of the present invention relates to the wheel loader according to the fifth aspect of the present invention. In the wheel loader, the travelling state detecting unit is further configured to detect that the vehicle is in a hill-climb released state shifted from the hill-climb travelling state as another state. Further, the mode switching determining unit is configured to switch between the engine output modes from the high output mode to the low output mode when the vehicle is detected to be in the hill-climb released state.

The hill-climb released state is herein detected and the high output mode, having been set so far, is switched into the low output mode. It is thereby possible to inhibit deterioration in fuel efficiency.

A wheel loader according to a ninth aspect of the present invention relates to the wheel loader according to the eighth aspect of the present invention. In the wheel loader, the travelling state detecting unit is configured to detect that the vehicle is in the hill-climb released state in satisfying at least one of: a condition that a throttle opening degree becomes less than a threshold opening degree; and a condition that a brake operation is performed.

It is herein determined that hill-climb travelling is finished and the high output mode becomes unnecessary either when an operator depresses an accelerator pedal and the throttle opening degree becomes less than the threshold opening degree or when a brake operation is performed. Accordingly, the high output mode is switched into the low output mode. Therefore, it is possible to avoid occurrence hunting in control.

According to the present invention as described above, a wheel loader can execute an appropriate switching control depending on a phase in switching between engine output modes.

DESCRIPTION OF THE EMBODIMENTS

Structure

Figure 1:
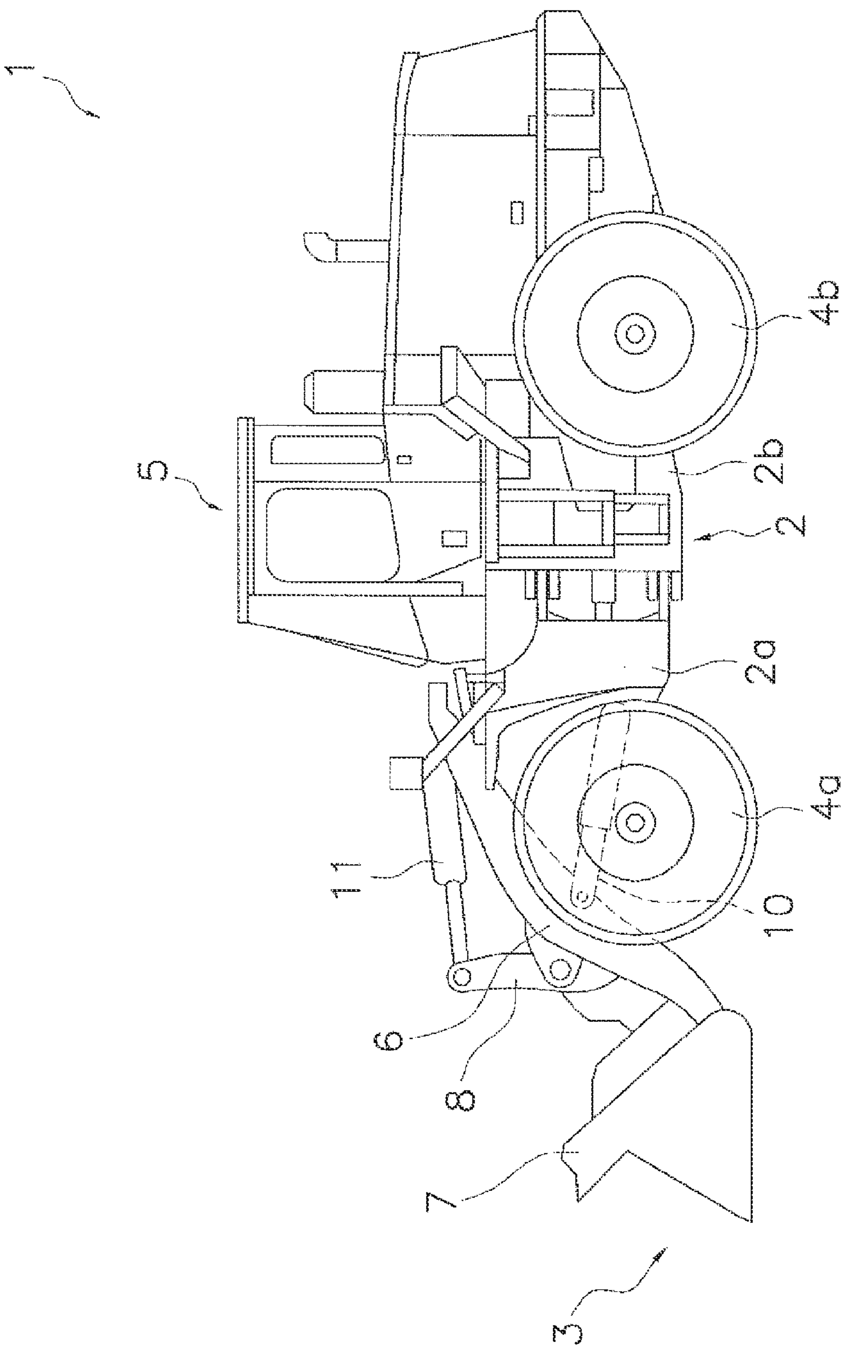
FIG. 1 is an external view of a wheel loader according to an exemplary embodiment of the present invention.
Figure 2:
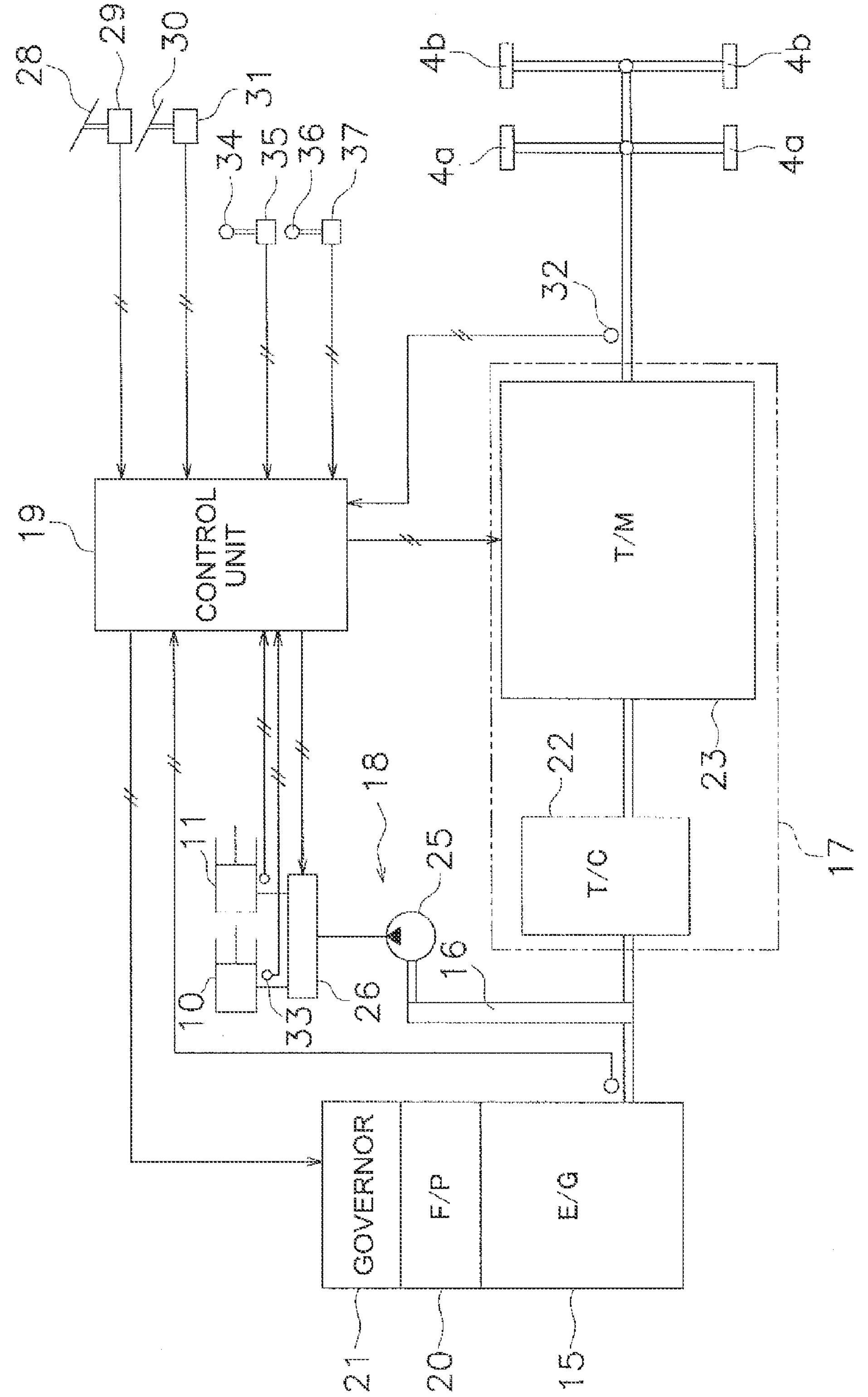
FIG. 2 is a schematic block diagram of the wheel loader.

FIG. 1 is an external view of a wheel loader 1 as a work vehicle, while FIG. 2 is a block diagram of the schematic structure of the wheel loader 1. The wheel loader 1 includes a vehicle body frame 2, a work implement 3, front wheels **4*a*, rear wheels 4*b* and a cab 5. The wheel loader 1 can be self-propelled by driving and rotating the front wheels 4*a* and the rear wheels 4*b*. The wheel loader 1 can execute a desired work using the work implement 3**.

The vehicle body frame 2 includes a front vehicle body part **2*a* and a rear vehicle body part 2*b*. The front vehicle body part 2*a* and the rear vehicle body part 2*b* are coupled while being pivotable in a right-and-left direction. The front vehicle body part 2*a* is provided with the work implement 3 and the front wheels 4*a*. The rear vehicle body part 2*b* is provided with the cab 5 and the rear wheels 4*b*. The work implement 3 includes a boom 6, a bucket 7, a bell crank 8 and etc. The boom 6 is configured to be pivoted up and down by means of a pair of lift cylinders 10. Further, the bucket 7 is attached to the tip of the boom 6. The bucket 7 is configured to be pivoted up and down by means of a bucket cylinder 11 through the bell crank 8**.

As illustrated in FIG. 2, the wheel loader 1 further includes an engine 15, a power take-off (PTO) 16, a power transmission mechanism 17, a cylinder driving unit 18 and a control unit 19.

The output of the engine 15 is controlled by regulating the amount of fuel to be injected into a cylinder. The amount of fuel is regulated through the control of an electric governor 21 attached to a fuel injection pump 20 of the engine 15 by the control unit 19.

The power take-off 16 is a device configured to divide and distribute the output of the engine 15 to the power transmission mechanism 17 and the cylinder driving unit 18.

The power transmission mechanism 17 is a device configured to transmit the driving force from the engine 15 to the front wheels 4*a* and the rear wheels 4*b*. The power transmission mechanism 17 includes a torque converter 22 and a transmission 23. The transmission 23 includes a forward/rearward travel clutch and a plurality of speed stage clutches corresponding to a plurality of speed stages. In the present exemplary embodiment, the transmission 23 is provided with four speed stage clutches and the speed stages can be switched among four stages from a first speed to a fourth speed.

The cylinder driving unit 18 includes a hydraulic pump 25 and a control valve 26. The output of the engine 15 is transmitted to the hydraulic pump 25 through the power take-off 16. Further, the operating oil discharged from the hydraulic pump 25 is supplied to the lift cylinders 10 and the bucket cylinder 11 through the control valve 26. It should be noted that the front wheels 4*a* and the rear wheels 4*b* are provided with wet multiple-disc hydraulic brake devices although not illustrated in FIGS. 1 and 2.

The control unit 19 is formed by a microcomputer including a RAM, a ROM, a CPU and etc. Signals are inputted into the control unit 19 from the following sensors.

(1) An accelerator opening degree sensor 29 configured to detect the opening angle of an accelerator pedal 28.

(2) A brake operation sensor 31 configured to detect an operation of a brake pedal 30.

(3) An output shaft rotation speed sensor 32 of the transmission 23. The control unit 19 is configured to calculate the vehicle speed and the acceleration based on a detection signal from the output shaft rotation speed sensor 32. Therefore, the output shaft rotation speed sensor 32 functions as a vehicle speed sensor and an acceleration sensor.

(4) A bottom pressure sensor 33 of the lift cylinders 10.

(5) A position sensor 35 of a forward/rearward travel lever 34.

(6) A position sensor 37 of a gear-shift lever 36.

Based on signals from the aforementioned sensors, the control unit 19 is configured to control the engine 15 and execute a variety of controls such as a driving control of the work implement driving unit 18, a gear-shift control of the transmission 23 and a brake control of the brake devices (not illustrated in the figures). It is notable that the control unit 19 has a travelling state detecting function, a mode switching determining function, an acceleration detecting function and a switching time controlling function, regarding a control of the output modes of the engine 15. The travelling state detecting function is a function of detecting whether or not the wheel loader 1 is in a hill-climb travelling state. The mode switching determining function is a function of determining that it should be currently required to switch between engine output modes from a low output mode to a high output mode when it is determined that the wheel loader 1 is in the hill-climb travelling state. The acceleration detecting function is a function of detecting the acceleration of the wheel loader 1 when it is determined that the engine output modes should be switched from the low output mode to the high output mode. The switching time controlling function is a function of controlling a switching time from the start to the end of mode switching in accordance with the acceleration.

Engine Output Modes

Figure 3:
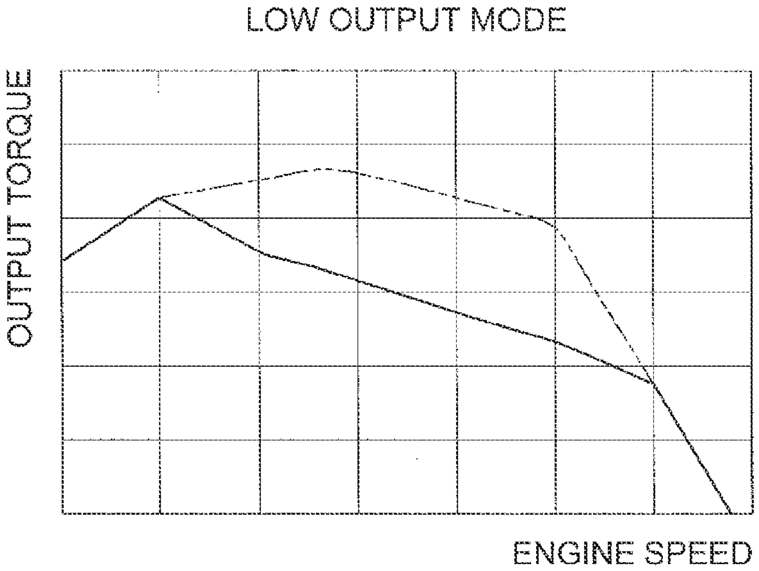
FIG. 3 includes charts representing relation between engine speed and output torque in a low output mode and that in a high output mode.
Figure 3:
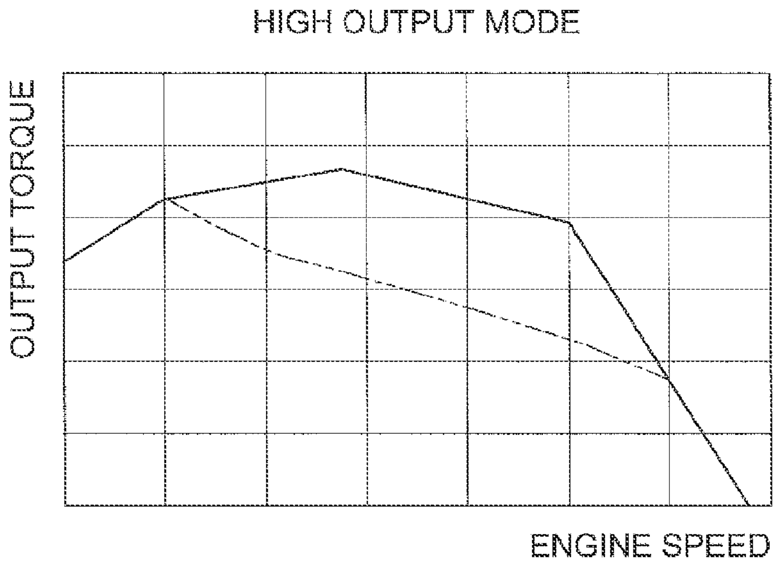
Figure 4:
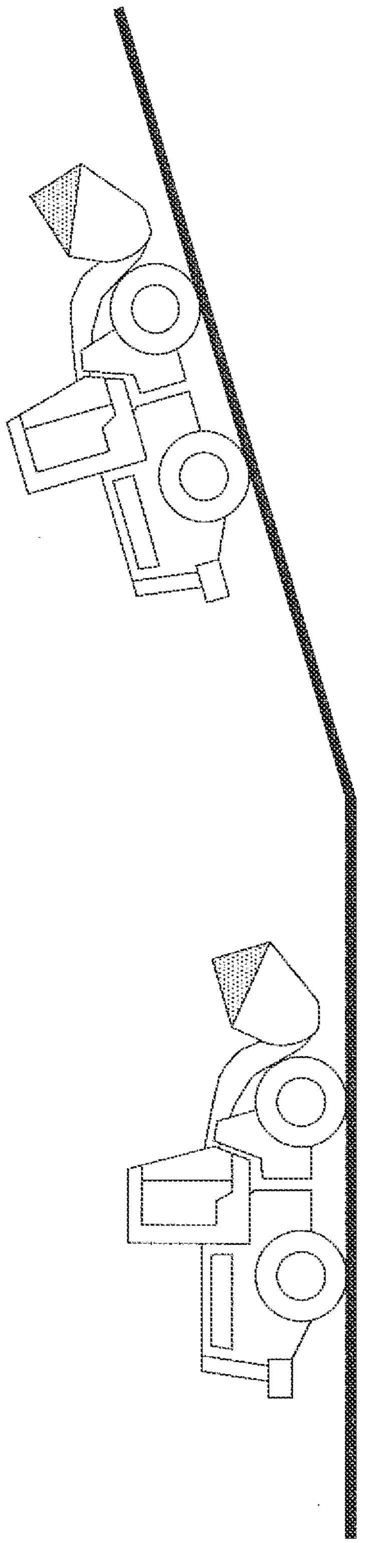
FIG. 4 is a diagram illustrating a state of flatland travelling and that of hill-climb travelling.

The control unit 19 is configured to execute a control of switching between the output modes of the engine 15 from a low output mode to a high output mode or vice versa. FIG. 3 represents curves of torque that can be outputted by the engine 15 in accordance with the rotation speed in the respective modes. The low output mode depicted with a solid line in FIG. 3(*a*) is a mode for achieving low fuel consumption. In the low output mode, the output torque is inhibited excluding in the low engine speed range and the high engine speed range. The low output mode is selected under a light load condition such as flatland travelling as illustrated in FIG. 4(*a*) and when the vehicle starts moving. The high output mode depicted with a solid line in FIG. 3(*b*) is a mode whereby higher output torque can be obtained than the low output mode. The high output mode is selected in hill-climb travelling as illustrated in FIG. 4(*b*).

Further, the control unit 19 is configured to execute a switching control of the output mode of the engine 15 between a power mode and an economy mode in response to an operator's instruction. The power mode is a mode to be selected by an operator when large engine output is required in either travelling or working. On the other hand, the economy mode is a mode for inhibiting the engine output at a lower level to achieve low fuel consumption.

It should be noted that the aforementioned output control of the engine 15 is executed by, for instance, controlling the upper limit of the amount of fuel to be injected into the engine 15.

Output Mode Switching Control

Figure 5:
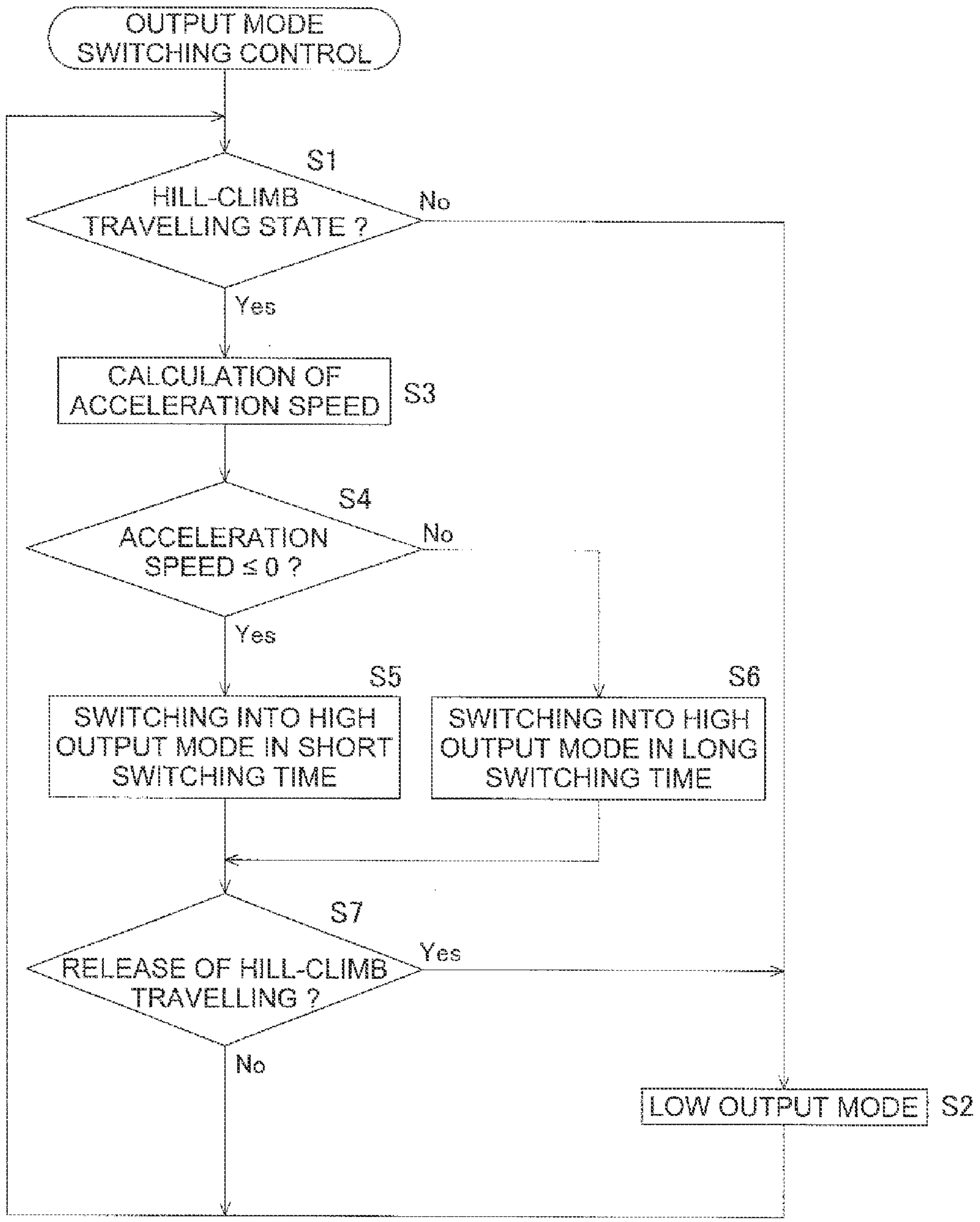
FIG. 5 is a flowchart for a control for switching engine output modes.

As described above, the present wheel loader 1 has the low output mode and the high output mode as the engine output modes. Further, the low output mode is selected for achieving low fuel consumption under a light load condition such as flatland travelling. On the other hand, the high output mode is selected under a heavy load condition such as hill-climb travelling. The output mode switching control will be hereinafter explained using a flowchart represented in FIG. 5.

In Step S1, it is determined whether or not the vehicle is in a hill-climb travelling state. It is herein determined that the vehicle is in the hill-climb travelling state when the following conditions 1 to 4 are all satisfied.

Condition 1: either a fully-accelerated state (an acceleration opening degree of 100%) or a state that an acceleration opening degree is greater than a predetermined value and this is maintained for a predetermined period of time or greater.

Condition 2: a brake operation is not being performed. Specifically, the brake pedal 30 is not being pressed down.

Figures 6, 7, 8:
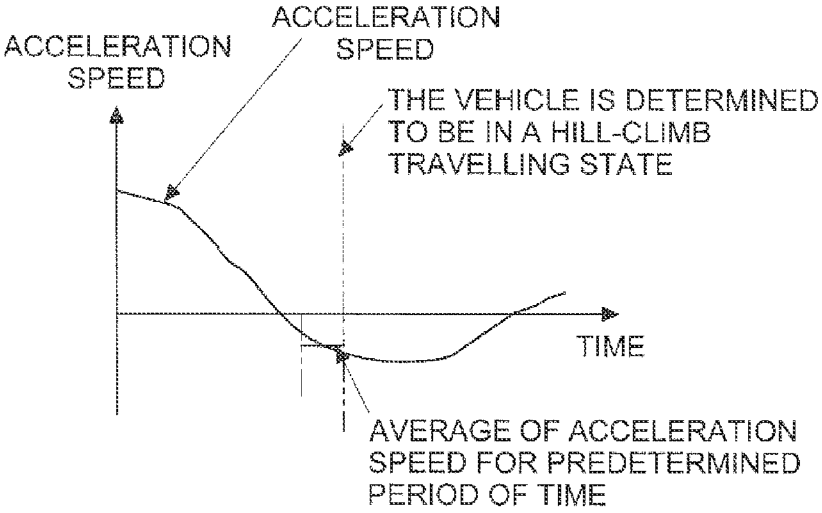
FIG. 6 represents thresholds of the vehicle speed for switching output modes.
FIG. 7 represents thresholds of the acceleration for switching output modes.
FIG. 8 is a chart representing variation in the acceleration when a vehicle shifts from flatland travelling to hill-climb travelling.

Condition 3: the vehicle speed and the acceleration are respectively less than or equal to values represented in FIGS. 6 and 7. A threshold value is herein set for each of the vehicle speed and the acceleration depending on which of the gear stages is being selected. It should be noted that these values can be changed depending on the mode (the power mode, the economy mode, etc.) or the loading condition (empty or loaded).

Condition 4: the vehicle is not in a digging state. Specifically, the bottom pressure of the lift cylinders 10 is less than or equal to a predetermined value and this is maintained for a predetermined period of time or greater.

The processing proceeds from Step S1 to Step S1 unless the aforementioned conditions 1 to 4 are all satisfied. In Step S2, the low output mode is maintained as an engine output mode.

On the other hand, the processing proceeds from Step S1 to Step S3 when the conditions 1 to 4 are all satisfied. In Step S3, calculation is performed for the acceleration at a point of time when the conditions 1 to 4 are all satisfied. It may be herein possible to use an average of the acceleration from the point of time when the conditions 1 to 4 are all satisfied to another point of time earlier than the point of time by a predetermined period of time.

Next in Step S4, it is determined whether or not the acceleration is either 0 or negative. When the acceleration average (or the acceleration) calculated in Step S3 is either 0 or negative, it is determined that the wheel loader 1 has shifted from flatland travelling to hill-climb travelling. Accordingly, the processing proceeds from Step S4 to Step S5. In Step S5, the engine output modes are switched from the low output mode to the high output mode in a short switching time. This will be hereinafter explained in detail.

First, light load is applied in flatland travelling, and therefore, the low output mode is set as an engine output mode. When the vehicle then shifts from a flatland illustrated in FIG. 4(*a*) to an uphill illustrated in FIG. 4(*b*), the vehicle speed is gradually reduced. FIG. 8 represents variation in the acceleration with time under the condition. As represented in FIG. 8, when the vehicle shifts from flatland travelling to hill-climb travelling, the acceleration is reduced with time and becomes negative. When the aforementioned conditions 1 to 4 are all satisfied, it is determined that the vehicle has shifted to hill-climb travelling.

Next, when the vehicle has shifted from flatland travelling to hill-climb travelling, i.e., when the acceleration is either 0 or negative, the low output mode is quickly switched into the high output mode. Specifically, the acceleration is negative as represented in FIG. 8, and therefore, the low output mode is switched into the high output mode in a short switching time by setting a change rate of the engine output torque, i.e., T/n (T: Nm, n: 0.01 sec) to be "$T_1$".

Figure 10:
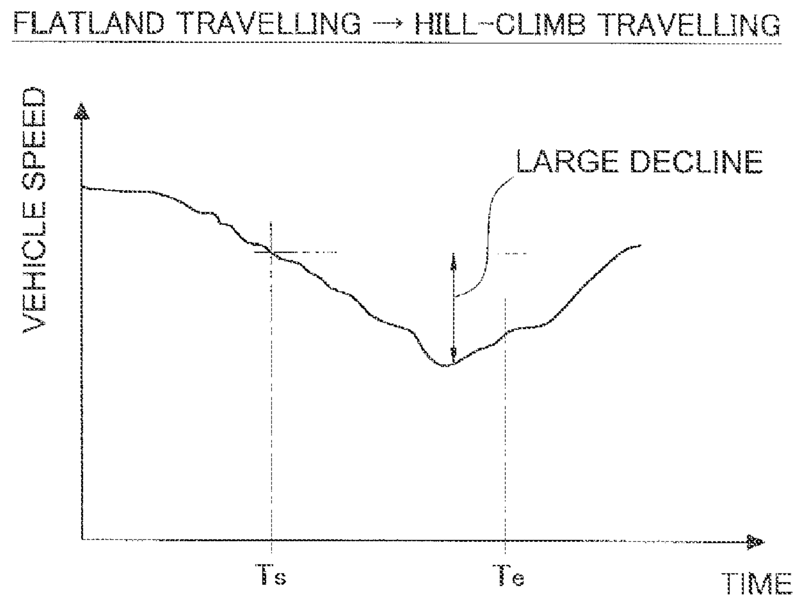
FIG. 10 includes charts representing variation in the vehicle speed when the vehicle has shifted from flatland travelling to hill-climb travelling.
Figure 10:
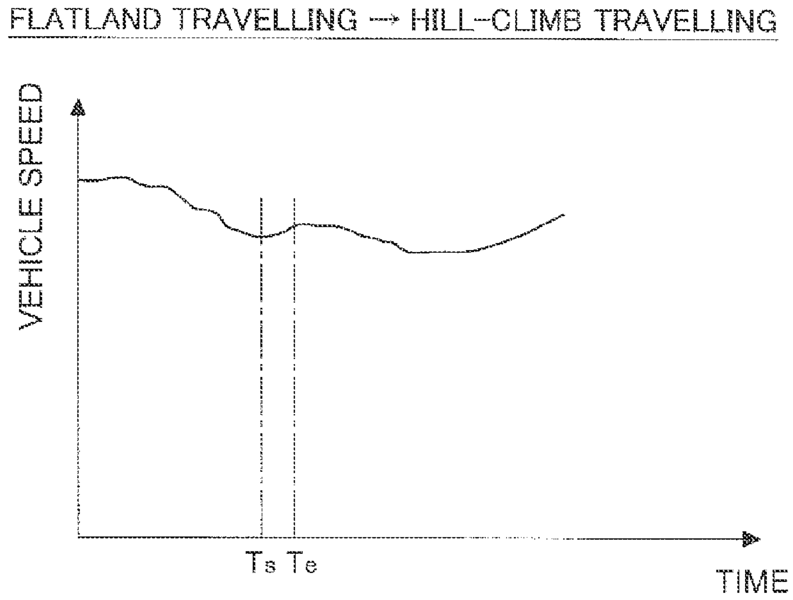

FIG. 10 represents difference of reduction in the vehicle speed between different switching time settings when the vehicle has shifted from flatland travelling to hill-climb travelling. FIG. 10(*a*) represents a case that the switching time of the output mode from a switching start clock time Ts to a switching end clock time Te is set to be relatively long by reducing the change rate T/n of the engine output torque to be $T_2$ ($<T_1$). On the other hand, FIG. 10(*b*) represents a case that the switching time from the switching start clock time Ts to the switching end clock time Te is set to be relatively short by increasing the change rate T/n of the engine output torque. As is obvious from the figures, it is possible to reduce decline in the vehicle speed by shortening the switching time.

On the other hand, when the acceleration (or the acceleration average) calculated in Step S3 is positive, it is determined that the vehicle starts moving on a hill. Accordingly, the processing proceeds from Step S4 to Step S6. In Step S6, the engine output modes are switched from the low output mode to the high output mode in a long switching time. This will be hereinafter explained in detail.

Figure 9:
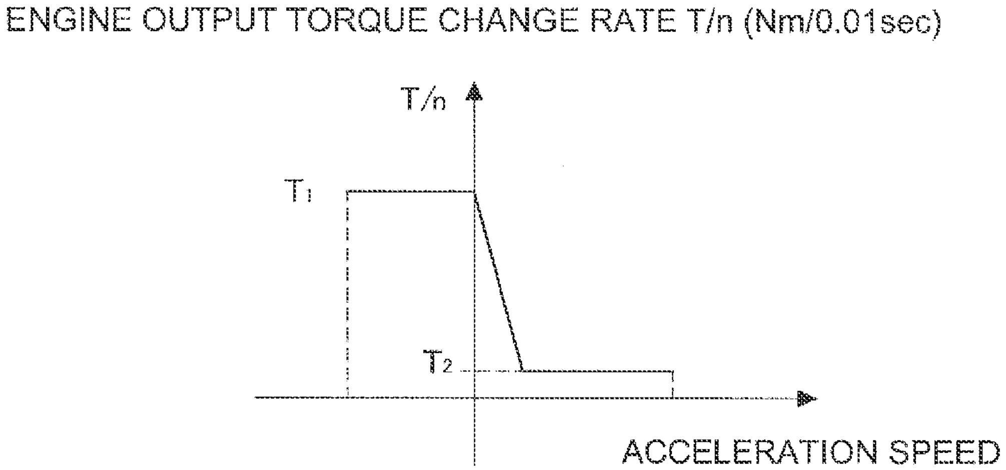
FIG. 9 is a chart representing a change rate of engine output torque with respect to the acceleration in switching output modes.

First, the low output mode is set as an engine output mode when the vehicle starts moving. Therefore, the low output mode is selected as an engine output mode even at hill start. Further, at hill start, the vehicle speed is gradually increased with time even in the low output mode. Therefore, the acceleration becomes positive. When it is thus determined that the vehicle is in the hill-climb travelling state while the acceleration is positive, the low engine output mode is gently switched into the high output mode. Specifically as represented in FIG. 9, the change rate of the engine output torque, i.e., T/n is set to be a value falling in a range from "$T_1$" to "$T_2$ ($<T_1$)" in accordance with the acceleration.

Figure 11:
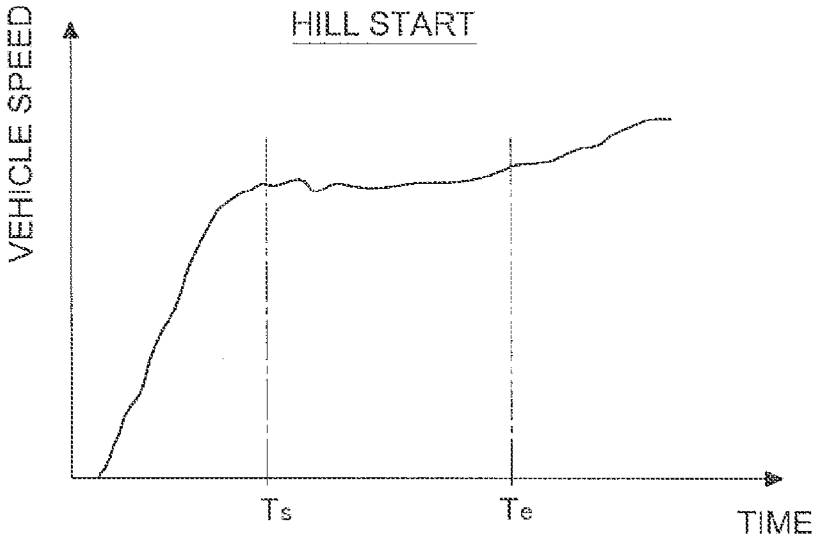
FIG. 11 includes charts representing variation in the vehicle speed when the vehicle is started moving on a hill.
Figure 11:
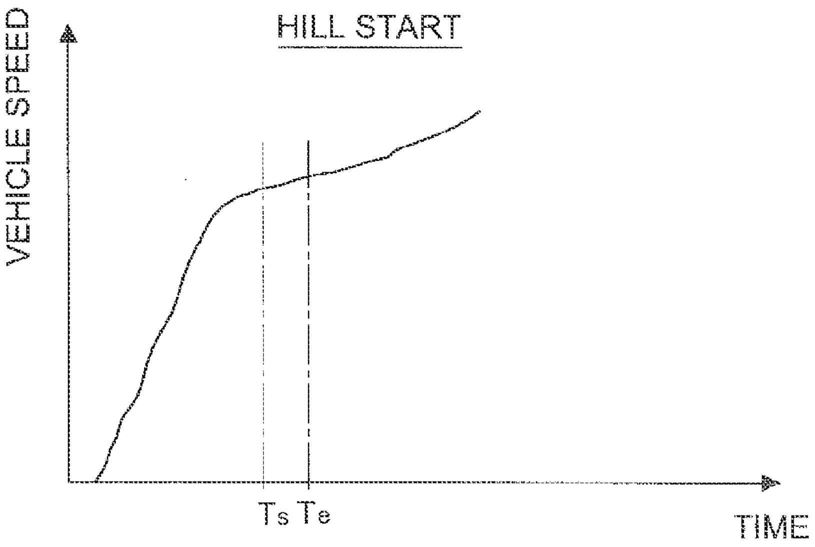

FIG. 11 represents variation in the vehicle speed at hill start. An example represented in FIG. 11(*a*) relates to a case that the switching time from the switching start clock time Ts to the switching end clock time Te is set to be relatively long similarly to the present exemplary embodiment by setting the change rate of the engine output torque to be $T_2$. In this case, the vehicle speed is gradually increased, and therefore, an operator does not have a feeling of strangeness. On the other hand, an example represented in FIG. 11(*b*) relates to a case that the switching time is set to be shorter than that in FIG. 11(*a*) by setting the change rate of the engine output torque to be $T_1$. In this case, the vehicle speed is increased in a short time immediately after the output mode is started being switched into the high output mode. Therefore, an operator has a feeling of strangeness.

As described above, when it is determined that the vehicle is in hill-climb travelling, the change rate of the output torque in switching the low output mode into the high output mode is changed in accordance with the acceleration. Therefore, the low output mode is quickly switched into the high output mode when the vehicle has shifted from flatland travelling to hill-climb travelling. Accordingly, decline in the vehicle speed can be reduced. At hill start, on the other hand, the low output mode is gently switched into the high output mode. Therefore, abrupt increase in the vehicle speed can be inhibited and thereby an operator can be inhibited from having a feeling of strangeness.

Next in Step S7, it is determined whether or not a hill-climb released condition is established. In other words, the processing proceeds from Step S7 to Step S2 either when the acceleration opening degree is reduced and thereby the condition 1 is not satisfied or when a brake operation is performed and thereby the condition 2 is not satisfied. Accordingly, the engine output modes are switched from the high output mode to the low output mode.

Advantageous Effects of Exemplary Embodiment (1) The time of switching between the engine output modes is controlled by detecting the hill-climb travelling state and simultaneously controlling the change rate of the engine output torque in accordance with the acceleration at that time. Therefore, it is possible to execute an appropriate switching control depending on a travelling phase.

Specifically, when the vehicle has shifted from flatland travelling to hill-climb travelling, the engine output modes are quickly switched from the low output mode to the high output mode. Therefore, it is possible to inhibit reduction in the vehicle speed and degradation in the acceleration performance immediately after the vehicle shifted to hill-climb travelling. Further, at hill start, the low output mode is gently switched into the high output mode. Therefore, the vehicle can be avoided from abruptly accelerating at hill start. This makes an operator less feel strange.

(2) It is detected that the vehicle is in a hill-climb travelling state using a sensor normally embedded in a wheel loader. Therefore, it is not required to provide a special sensor such as an inclination sensor. Further, error detection can be avoided.

(3) It is detected that the vehicle is not in a hill-climb travelling state based on either the fact that the throttle opening degree becomes less than a threshold or the fact that a brake operation is performed. Therefore, it is possible to avoid occurrence of hunting in control.

Other Exemplary Embodiments

The present invention is not limited to the aforementioned exemplary embodiment and a variety of changes or modifications can be herein made without departing from the scope of the present invention.

Numeric values described in the aforementioned exemplary embodiment are exemplary only, and the present invention is not limited to the numeric values.

According to the aforementioned wheel loader, an appropriate switching control can be performed depending on a phase in switching between engine output modes.

The invention claimed is:

1. A wheel loader having a low output mode and a high output mode as engine output modes, the wheel loader comprising:

an engine;

a transmission having an output shaft;

an output shaft rotational speed sensor configured and arranged to detect a rotational speed of the output shaft;

a driving wheel;

a power transmission device configured to transmit driving force from the engine to the driving wheel;

a work implement configured to be driven by the driving force from the engine; and an engine control device configured to execute a mode switching control of switching between the low output mode and the high output mode, the engine control device being configured and arranged to receive a detection signal from the output shaft rotational speed sensor, the engine control device comprising a microcomputer programmed to include a travelling state detecting unit configured to detect if the wheel loader is in a hill-climb travelling state;

a mode switching determining unit configured to determine that it is required to switch from the low output mode to the high output mode upon the travelling state detecting unit detecting that the wheel loader is in the hill-climb traveling state;

an acceleration detecting unit configured to detect an acceleration of the wheel loader upon the mode switching determining unit determining that it is required to switch between the engine output modes due to the wheel loader being in the hill-climb travelling state; and a switching time controlling unit configured to set a mode switching time in accordance with the acceleration detected by the acceleration detecting unit, the switching time controlling unit setting the mode switching time to a first time if the acceleration detected by the acceleration detecting unit is either 0 or negative, indicating the wheel loader has shifted from flatland travelling to hill-climb traveling, and a second time greater than the first time if the acceleration detected by the acceleration detecting unit is positive, indicating that the wheel loader has started moving on a hill from a stopped state, the engine control device being configured to execute the mode switching control such that a time from start to end of the mode switching control is equal to the mode switching time set by the switching time controlling unit upon the traveling state detecting unit detecting that the wheel loader is in a hill-climb travelling state.

2. A wheel loader having a low output mode and a high output mode as engine output modes, the wheel loader comprising:

an engine;

a transmission having an output shaft;

an output shaft rotational speed sensor configured and arranged to detect a rotational speed of the output shaft;

a driving wheel;

a power transmission device configured to transmit driving force from the engine to the driving wheel;

a work implement configured to be driven by the driving force from the engine; and an engine control device configured to execute a mode switching control of switching between the low output mode and the high output mode, the engine control device being configured and arranged to receive a detection signal from the output shaft rotational speed sensor, the engine control device comprising a microcomputer programmed to include a travelling state detecting unit configured to detect if the wheel loader is in a hill-climb travelling state;

a mode switching determining unit configured to determine that it is required to switch from the low output mode to the high output mode upon the travelling state detecting unit detecting that the wheel loader is in the hill-climb traveling state;

an acceleration detecting unit configured to detect an acceleration of the wheel loader upon the mode switching determining unit determining that it is required to switch between the engine output modes due to the wheel loader being in the hill-climb travelling state; and an output torque change rate controlling unit configured to set a change rate of an output torque of the engine in accordance with the acceleration detected by the acceleration detecting unit, the output torque change rate controlling unit setting the change rate to a first change rate if the acceleration detected by the acceleration detecting unit is either 0 or negative, indicating the wheel loader has shifted from flatland travelling to hill-climb traveling, and a second change rate less than the first change rate if the acceleration detected by the acceleration detecting unit is positive, indicating that the wheel loader has started moving on a hill from a stopped state, the engine control device being configured to execute the mode switching control such that the output torque of the engine changes at the change rate set by the output torque change rate controlling unit from start to end of the mode switching control upon the traveling state detecting unit detecting that the wheel loader is in a hill-climb travelling state.

3. The wheel loader recited in claim 1, wherein the travelling state detecting unit is configured to determine that the wheel loader is in the hill-climb travelling state upon the following conditions being satisfied: a condition that a vehicle speed is less than or equal to a predetermined value; a condition that a throttle opening degree has been kept greater than or equal to a preliminarily set threshold opening degree for a predetermined period of time or greater; and a condition that a brake operation is not being performed.

4. The wheel loader recited in claim 3, wherein the conditions to be satisfied for the travelling state detecting unit to determine that the wheel loader is in the hill-climb travelling state further include a condition that the acceleration is less than or equal to a predetermined value.

5. The wheel loader recited in claim 3, wherein the travelling state detecting unit is further configured to detect that the wheel loader has shifted from the hill-climb travelling state to a hill-climb released state, the hill-climb released state being different from the hill-climb traveling state, and the mode switching determining unit is configured to switch from the high output mode to the low output mode when the wheel loader is detected to be in the hill-climb released state.

6. The wheel loader recited in claim 5, wherein the travelling state detecting unit is configured to detect that the wheel loader is in the hill-climb released state upon at least one of the following conditions being satisfied: a condition that a throttle opening degree becomes less than the threshold opening degree; and a condition that a brake operation is performed.

* * * * *